US006924804B2

(12) United States Patent
Lake et al.

(10) Patent No.: US 6,924,804 B2
(45) Date of Patent: Aug. 2, 2005

(54) REDUCING THE RESOLUTION OF BONES IN A THREE-DIMENSIONAL MODEL

(75) Inventors: Adam T. Lake, Portland, OR (US); Carl S. Marshall, Portland, OR (US)

(73) Assignee: Intel Corporation, Armonk, CA (US)

( * ) Notice: Subject to any disclaimer, the term of this patent is extended or adjusted under 35 U.S.C. 154(b) by 233 days.

(21) Appl. No.: 09/965,515

(22) Filed: Sep. 25, 2001

(65) Prior Publication Data

US 2003/0058240 A1 Mar. 27, 2003

(51) Int. Cl.⁷ .............................................. G06T 15/70
(52) U.S. Cl. ..................................... 345/473; 345/420
(58) Field of Search ................................ 345/419, 420, 345/473, 427, 428, 423, 475

(56) References Cited

U.S. PATENT DOCUMENTS

| | | |
|---|---|---|
| 4,600,919 A | 7/1986 | Stern |
| 4,747,052 A | 5/1988 | Hishinuma et al. |
| 4,835,712 A | 5/1989 | Drebin et al. |
| 4,855,934 A | 8/1989 | Robinson |
| 4,901,064 A | 2/1990 | Deering |
| 5,124,914 A | 6/1992 | Grangeat |
| 5,163,126 A | 11/1992 | Einkauf et al. |
| 5,371,778 A | 12/1994 | Yanof et al. |
| 5,611,030 A | 3/1997 | Stokes |
| 5,731,819 A | 3/1998 | Gagne et al. |
| 5,757,321 A | 5/1998 | Billyard |
| 5,786,822 A | 7/1998 | Sakaibara |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,894,308 A * | 4/1999 | Isaacs .......................... 345/420 |
| 5,929,860 A | 7/1999 | Hoppe |
| 5,933,148 A | 8/1999 | Oka et al. |
| 5,949,969 A | 9/1999 | Suzuoki et al. |
| 5,966,133 A | 10/1999 | Hoppe |
| 5,966,134 A | 10/1999 | Arias |
| 5,974,423 A | 10/1999 | Margolin |
| 6,054,999 A | 4/2000 | Strandberg |
| 6,057,859 A | 5/2000 | Handelman et al. |

(Continued)

OTHER PUBLICATIONS

Alliez et al., "Progressive Compression for Lossless Transmission of Triangle Meshes." University of Southern California, Los Angeles, CA: 195–202.

Bajaj et al., "Progressive Compression and Transmission of Arbitrary Triangular Meshes." Department of Computer Sciences, University of Texas at Austin, TX.

Chow, "Optimized Geometry Compression for Real–time Rendering." Massachusetts Institute of Technology, Proceedings Visualization 1997, Oct. 19–24, 1997, Phoenix, AZ: 347–354.

Cohen–Or et al., "Progressive Compression of Arbitrary Triangular Meshes." Computer Science Department, School of Mathematics Sciences, Tel Aviv, Israel.

(Continued)

*Primary Examiner*—Mark Zimmerman
*Assistant Examiner*—Enrique L. Santiago
(74) *Attorney, Agent, or Firm*—Fish & Richardson P.C.

(57) ABSTRACT

Modifying a three-dimensional model includes constructing a bones infrastructure for a polygon mesh, removing edges of polygons in the polygon mesh to reduce a resolution of the polygon mesh, receiving an instruction to reduce a number of bones in the bones infrastructure, reducing the number of bones in the bones infrastructure in response to the instruction, and associate the polygon mesh with the bones infrastructure having a reduced number of bones.

30 Claims, 5 Drawing Sheets

U.S. PATENT DOCUMENTS

| | | | |
|---|---|---|---|
| 6,078,331 A | 6/2000 | Pulli et al. | |
| 6,115,050 A | 9/2000 | Landau et al. | |
| 6,175,655 B1 | 1/2001 | George et al. | |
| 6,191,787 B1 | 2/2001 | Lu et al. | |
| 6,191,796 B1 | 2/2001 | Tarr | |
| 6,198,486 B1 | 3/2001 | Junkins et al. | |
| 6,201,549 B1 | 3/2001 | Bronskill | |
| 6,208,347 B1 | 3/2001 | Migdal et al. | |
| 6,219,070 B1 | 4/2001 | Baker et al. | |
| 6,239,808 B1 | 5/2001 | Kirk et al. | |
| 6,252,608 B1 | 6/2001 | Snyder et al. | |
| 6,262,737 B1 | 7/2001 | Li et al. | |
| 6,262,739 B1 | 7/2001 | Migdal et al. | |
| 6,292,192 B1 | 9/2001 | Moreton | |
| 6,317,125 B1 * | 11/2001 | Persson | 345/423 |
| 6,337,880 B1 | 1/2002 | Cornog et al. | |
| 6,388,670 B2 | 5/2002 | Naka et al. | |
| 6,405,071 B1 | 6/2002 | Analoui | |
| 6,437,782 B1 | 8/2002 | Pieragostini et al. | |
| 6,478,680 B1 | 11/2002 | Yoshioka et al. | |
| 6,559,848 B2 * | 5/2003 | O'Rourke | 345/473 |
| 6,593,924 B1 | 7/2003 | Lake et al. | |
| 6,593,927 B2 | 7/2003 | Horowitz et al. | |
| 6,608,627 B1 | 8/2003 | Marshall et al. | |
| 6,608,628 B1 | 8/2003 | Ross et al. | |
| 2001/0026278 A1 * | 10/2001 | Arai et al. | 345/474 |
| 2002/0101421 A1 * | 8/2002 | Pallister | 345/428 |

OTHER PUBLICATIONS

Dyn, N., Levin, D., and Gregory, J.A. "A Butterfly Subdivision Scheme for Surface Interpolation with Tension Control." *ACM Transactions on Graphics*, vol. 9, No. 2 (1990).

Elber, "Line Art Rendering via a Coverage of Isoperimetric Curves." *IEEE Transactions on Visualization and Computer Graphics*, vol. 1, Department of Computer Science, Technion, Israel Institute of Technology, Haifa, Israel (Sep. 1995).

Foley et al., "Computer graphics: principal and practice." *Addison–Wesley Publishing Company*, Reading, MA, 1996: 1060–1064.

Hoppe, "Efficient Implementation of progressive meshes." *Coput. & Graphics*, vol. 22, No. 1: 27–36 (1998).

Hoppe, "Progressive Meshes." *Microsoft Research:* 99–108. http://www.research.microsoft.com/research/graphics/hoppe/.

Hoppe, "Progressive Simplicial Complexes." *Microsoft Research*. http://www.research.microsoft.com/~hoppe/.

Landsdown et al., "Expressive Rendering: A Review of Nonphotorealistic Techniques" *IEEE Computer graphics and Applications:* 29–37 (1995).

Lasseter, "Principles of Traditional Animation Applied to 3D Computer Animation" *Pixar,* San Rafael, California, 1987.

Lee, "Navigating through Triangle Meshes Implemented as Linear Quadtrees" Computer Science Department, Center for Automation Research, Institute for Advanced Computer Studies, University of Maryland College Park, MD, Apr., 1998.

Lewis, "Pose Space Deformation: A Unified Approach to Shape Interpolation and Skeleton–Driven Deformation." *Centropolis,* New Orleans, LA: 165–172.

Ma et al., "Extracting Feature Lines for 3D Unstructured Grids" Institute for Computer Applications in Science and Engineering (ECASE), NASA Langley Research Center, Hampton, VA, *IEEE* (1997).

Markosian, "Real–Time Nonphotorealistic Rendering" Brown University site of the NSF Science and Technology Center for Computer Graphics and Scientific Visualization, Providence, RI.

Pajarola et al., "Compressed Progressive Meshes" Graphics, Visualization & Usability Center, College of Computing, Georgia Institute of Technology, Jan., 1999.

Popovic et al., "Progressive Simplicial Complexes" *Microsoft Research,* http://www.research.microsft.com/hoppe/.

Raskar, "Image Precision Silhoutte Edges" University of North Carolina at Chapel Hill, *Microsoft Research,* 1999 Symposium on Interactive 3D Graphics Atlanta, GA: 135–231 (1999).

Samet, "Applications of spatial data structures: computer graphics, image processing, and GIS." University of Maryland, *Addison–Wesley Publishing Company,* Reading, MA: 1060–1064 (Jun., 1990).

Taubin et al., "Progressive Forest Spilt Compression." IBM T.J. Watson Research Center, Yorktown Heights, NY.

Thomas et al., "The Illusion of Life: Disney Animation," *Hyperion,* 3:47–71, New York, NY (1981).

Zeleznik et al., "SKETCH: An Interface for Sketching 3D Scenes." Brown University site of the NSF Science and Technology Center for Comptuer Graphics and Scientific Visualization (1996).

Zorin, D., Schroeder, P., and Sweldens, W. "Interpolating Subdivision for Meshes of Arbitrary Topology." Tech. Rep. CS-TR-96-06, Caltech, Department of Computer Science, (1996).

http://research.microsoft.com/~hoppe/™pm.

Appel, Arthur, "The Notion of Quantitative Invisibility and the Machine Rendering of Solids." Proceedings of 22nd National Conference Association for Computing Machinery 1967.

Buck et al., "Performance–Driven Hand Drawn Animation", *ACM* (NPAR2000), pp. 101–108 (2000).

Catmull et al., "Recursively Generated B–Spline Surfaces on Arbitrary Topological Meshes," Computer Aided Design, 10(6):350–355 (1978).

Coelho et al., "An Algorithm for Intersecting and Trimming Parametric Meshes", *ACM* SIGGRAPH, pp. 1–8 (1998).

Deering, M., "Geometry Compression," *Computer Graphics.* SIGGRAPH '95, pp. 13–20, 1995.

DeRose et al., "Subdivisional Surfaces in Character Animation", *ACM,* SIGGRAPH'98, pp. 85–94 (1998).

Elber, Gershon, "Interactive Line Art Rendering of Freeform Surfaces", *Eurographics'99,* 18(3):C1–C12 (1999).

Gooch et al., "A Non–Photorealistic Lighting Model for Automatic Technical Illustration," *Computer Graphics Proceedings, Annual Conference Series, SIGGRAPH'98,* pp. 447–452 (1998).

Gooch et al., "Interactive Technical Illustration," *ACM Interactive 3D,* pp. 31–38 (1999).

Heidrich et al., "Realistic, Hardware–Accelerated Shading and Lighting", *ACM,* (SIGGRAPH'99), pp. 171–178 (1999).

Kumar et al., "Interactive Display of Large Scale NURBS Models", *ACM,* Symp. On Interactive 3D Graphics, pp. 51–58 (1995).

Lake et al., "Stylized Rendering Techniques for Scalable Real–Time 3D Animation", NPAR, 101–108 (2000).

Lander, Jeff, "Making Kine More Flexible,"Game Developer Magazine, 5 pgs., Nov. 1998.

Lander, Jeff, "Skin Them Bones," Game Developer Magazine, 4 pgs., May 1998.

Pedersen, "A Framework for Interactive Texturing on Curved Surfaces", *ACM*, pp. 295–301 (1996).

"pmG Introduces Messiah: Animate 3.0", URL: http://www.digitalproducer.com/aHTM/Articles/july_2000/july_17_00/pmg_intros_messiah_animate.htm (Accessed Oct. 26, 2004) 2 pgs.

Pueyo, X. et al., "Rendering Techniques '96," Proc. of Eurographics Rendering Workshop 1996, EUROGRAPHICS, pp. 61–70 (1996).

Rockwood, A. et al., "Real–time Rendering of Trimmed Surfaces," Computer Graphics (SIGGRAPH '89 Proceedings) 23:107 –116 (1989).

Sousa, M., et al., "Computer–Generated Graphite Pencil Rendering of 3–D Polygonal Models", Eurographics'99, 18(3):C195 –C207 (1999).

Stam, J., "Exact Evaluation of Catmull–Clark Subdivision Surfaces at Arbitrary Parameter Values", SIGGRAPH 98 Conference Proceedings, Annual Conference Series, pp. 395–404 (1998).

Taubin et al., "3D Geometry Compression", SIGGRAPH'98 Course Notes (1998).

Wilhelms, J. & Van Gelder, A., "Anatomically Based Modeling," Univ. California Santa Cruz [online], 1997 [retrieved Dec. 22, 2004,], retrieved from the Internet: <URL: http://graphics.stanford.edu/courses/cs448–01–spring/papers/wilhelms.pdf>.

* cited by examiner

REDUCING THE RESOLUTION OF BONES IN A THREE-DIMENSIONAL MODEL

TECHNICAL FIELD

This invention relates to modifying a three-dimensional (3D) model and, in particular, to reducing a resolution of the 3D model by decreasing the number of bones in the 3D model.

BACKGROUND

A 3D model includes a virtual skeleton/infrastructure comprised of bones that are arranged in a hierarchical tree structure. Surrounding the bones is a polygon mesh, comprised of polygons such as triangles, which represents the skin of the 3D model. Movement of the polygon mesh is tied to the movement of the bones so that the 3D model approximates real-life movement when the bones are re-positioned.

The 3D model inhabits a virtual world, in which the distance to a virtual camera dictates perspective. That is, objects farther away from the virtual camera are depicted as smaller than objects closer to the virtual camera. Objects that are farther away can be depicted with less detail without significantly affecting the quality of the 3D animation.

DESCRIPTION

Figure 1:
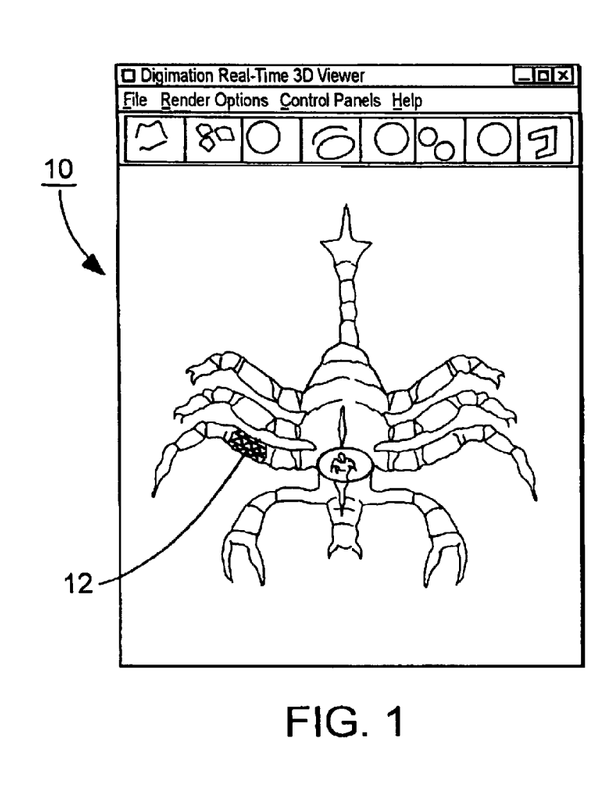
FIG. 1 is a view of a 3D model.

FIG. 1 shows a 3D model 10, which is rendered from 3D data. As shown in FIG. 1, 3D model 10 is comprised of a polygon mesh 12. The polygons are triangles in this embodiment; however, other types of polygons may be used. Polygon mesh 12 define the "skin" surface of 3D model 10.

Figure 2:
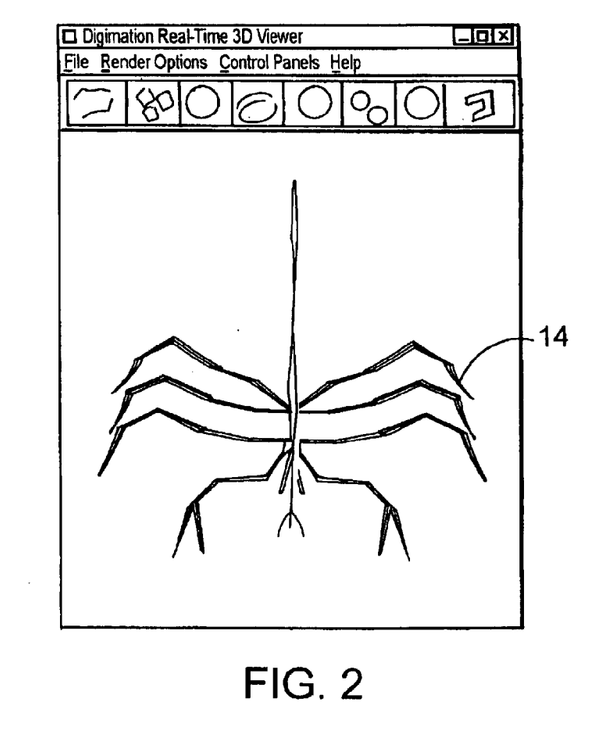
FIG. 2 is a view of bones in the 3D model.

The 3D data for model 10 also includes bone data. The bone data defines a rigid skeletal structure 14 of model 10 (FIG. 2). The skeletal structure corresponds to the bones of a living being. In this embodiment, the "bones" in the skeletal structure are Cartesian XYZ-space vectors.

Figure 3:
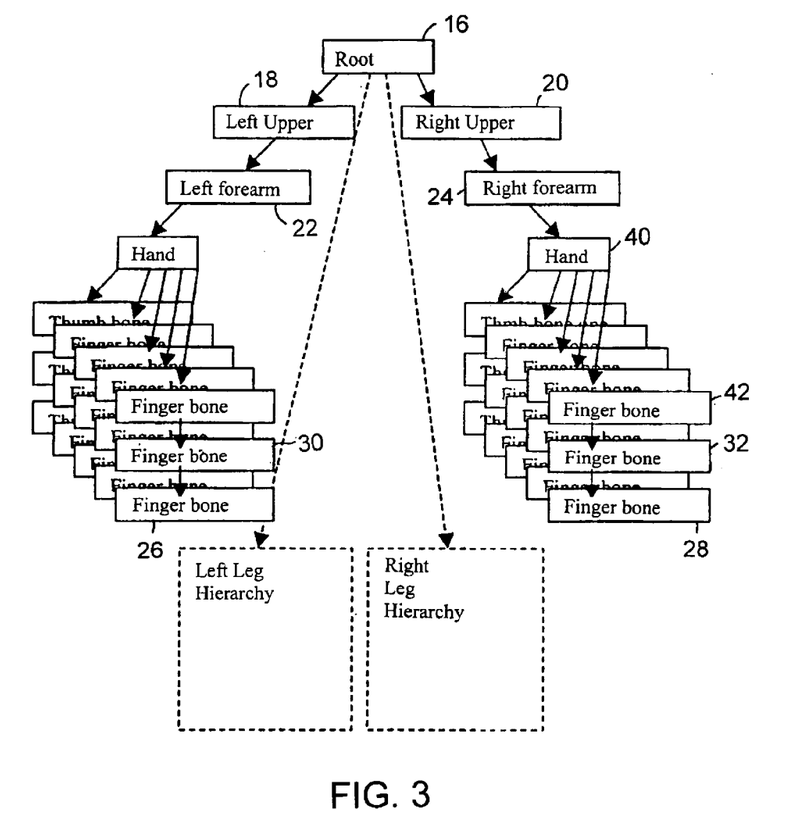
FIG. 3 is a block diagram of a bones hierarchy.

The bones of model 10 are linked together in a tree-like hierarchical structure, with higher-resolution "child" bones branching off from lower-resolution "parent" bones. FIG. 3 shows an example of the hierarchical structure. In more detail, root bone 16, which may represent the body of a 3D model, branches down to left upper arm bone 18 and right upper arm bone 20. These bones, in turn, branch down to left forearm bone 22 and right forearm bone 24, respectively, and so on. Bones at the bottom of the hierarchy, such as finger bones 26 and 28 are referred to as "higher resolution" bones than bones that are further up in the hierarchy, such as finger bones 30 and 32. This is so because bones further down in the hierarchy provide higher resolution for the 3D model. That is, the additional bones provide added detail.

Figure 4:
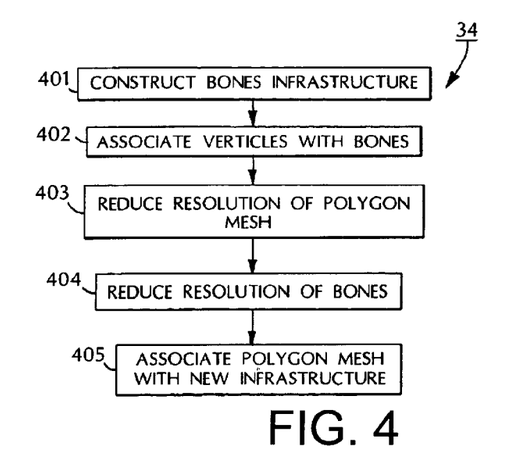
FIG. 4 is a flowchart showing a process for reducing the resolution of bones in a 3D model.

Each vertex of a polygon 12 (FIG. 1) is associated with one or more bones of the 3D model. This association is defined in the 3D data that makes up 3D model 10. A polygon deforms around a bone that the polygon is associated with, much the same way that skin surrounding living bone deforms in response to an applied force. The bones may change location in response to such force, but do not change shape. Referring to FIG. 4, a process 34 is shown for modifying a 3D model to reduce its resolution. Process 34 constructs (401) the 3D model, including a bones infrastructure. This may be done manually, automatically (i.e., without user intervention), or a combination of manually and automatically.

In more detail, a user (author) creates a high-resolution 3D polygon mesh. This may be done using conventional 3D graphics generation tools. The author also creates a high-resolution bones infrastructure underneath the 3D polygon mesh and associates (402) individual bones with vertices of the mesh. That is, the author stores data that relates each bone to one or more vertices of polygons in the 3D mesh. The association may be made using a standard 3D graphics tool (i.e., computer program/application) that operates automatically or interactively in response to user input.

Figure 5:
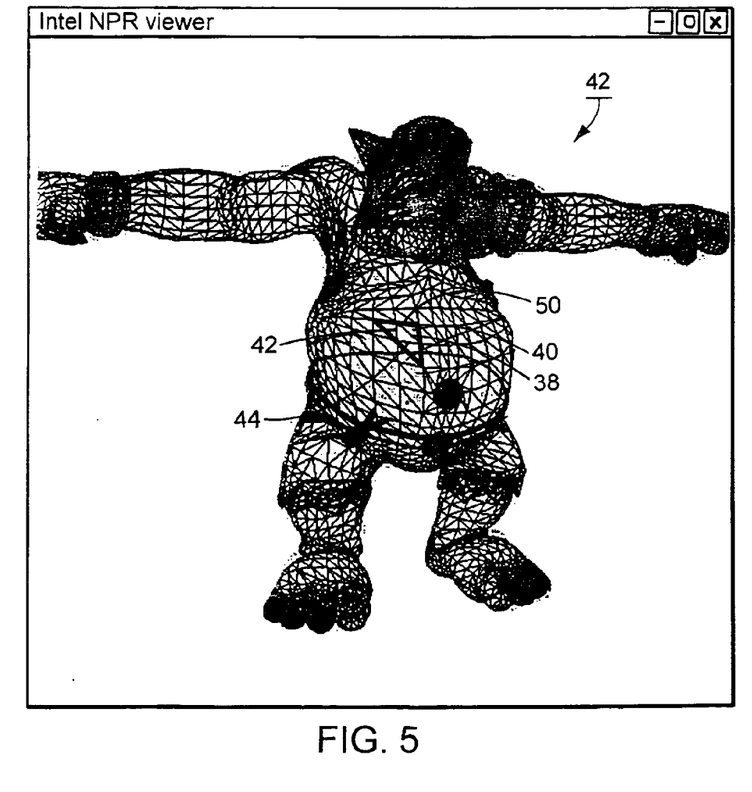
FIG. 5 is a view of polygons in a polygon mesh.

Process 34 reduces (403) the resolution of the 3D polygon mesh. One technique that may be used to reduce the resolution is the multi-resolution mesh (MRM) technique. This technique involves removing edges of polygons, particularly edges that are interior to a 3D model, and then connecting unconnected vertices to form new, larger polygons. By way of example, as shown in FIG. 5, edge 38 of polygon 40 is interior to 3D model 42. Consequently, its removal will not have a dramatic effect either way on the resolution of the 3D model. Accordingly, edge 38 can be removed, along, e.g., with edges 42 and 44 to combine the smaller polygons and produce a larger polygon 50. Any vertices that are unconnected (no unconnected vertices are shown) may be connected to other vertices.

It is noted that multi-resolution mesh is but one example of a process that may be used to reduce the resolution of the 3D polygon mesh. Other such processes may be used instead of, or in addition to, the multi-resolution mesh. Furthermore, the resulting output of the polygon reduction process (404) may be modified manually by a user, if desired.

Process 34 reduces (404) the resolution of bones in the 3D polygon mesh. Generally, the reduction in resolution of the bones is commensurate with the reduction in resolution of the 3D polygon mesh; however, this is not a requirement. Process 34 may reduce the resolution of the bones either manually, automatically or a combination of the two.

Figure 8:
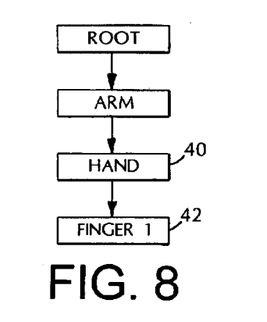
FIG. 8 is a block diagram of a reduced-resolution bones hierarchy.

Taking the manual case first, the user selects bones to be removed from the hierarchical bones infrastructure. For example, referring to hand 40 of FIG. 3, the user may select to remove finger bones 28 and 32 for one of its fingers. The resulting reduced-resolution 3D model is shown in FIG. 8. As shown in FIG. 8, the lower-resolution finger bones 28 and 32 are removed, resulting in a "one-bone" finger 42. Assuming that the reduced-resolution 3D model is far enough away from the virtual camera, or that it is not the focus of a scene, the resulting visual should not be significantly affected.

Process 34 may achieve the same effect as in FIG. 8 using an automatic (or interactive) bone reduction technique. In more detail, process 34 may provide the user with a graphical display that allows the user to "dial down" the number of bones in the 3D model. That is, process 34 receives an instruction from the user to reduce the resolution of the bones and reduces their resolution in response to the received instruction. For example, the user may be given the opportunity to reduce the number of bones in the 3D model by a certain percentage. A linear or logarithmic scale may be used to reduce the number of bones in the 3D model. For example, if the reduction is 50%, only 50% of the bones down each path (e.g., arm 24) are used. As another alternative, if the number of polygons in the 3D polygon mesh has been reduced by a certain percentage, the number of bones in the 3D model may also be reduced by that same percentage. Alternatively, the reductions in polygons and bones in the 3D model may be related by another mathematical formula.

Instead of removing the lowest resolution bone/bones (e.g., bones 28 and 32 of FIG. 3) from a 3D model, lower resolution bones may be retained, while still reducing the overall resolution of the 3D model. That is, referring to FIG. 3, the bones of a 3D model are arranged hierarchically such that a lower-resolution bone 40 branches down to two or more succeeding bones 42, 32, and 28 and such that each of the succeeding bones (e.g., bone 32) has a higher-resolution than its predecessor (e.g., bone 42). In this embodiment, process 34 reduces the number of bones in the 3D model by connecting one of the succeeding, higher-resolution bones to the lower-resolution bone and removing the remaining intervening (i.e., "in between") high-resolution bones. Finally, the vertices of the polygons associated with the old bone structure are re-mapped to the new, lower resolution bone structure.

By way of example, process 34 may connect high-resolution bone 28 to lower-resolution bone 40. Once those two bones are connected, process 34 removes the remaining intervening bones 32 and 42. This way, process 34 essentially retains the same level of resolution in the 3D model, while still reducing the number of bones. Removing the intervening high-resolution bones may have an effect on the mobility of the 3D model. However, depending upon the placement and scale of the 3D model in the 3D environment, this effect may be relatively insignificant in comparison to the reduction in data.

Process 34 may remove both highest-resolution bones and intervening bones. For example, referring to FIG. 4, process 34 may connect bone 32 to bone 40 and then remove highest-resolution bone 28 and intervening bone 42. Which bones that are to be removed may be selected automatically, using a mathematical reduction process, or manually using an interactive graphics tool. In this regard, the user may allow the automatic process to take place, and then go back and make changes to the resulting 3D model manually. Any number of contingencies are within the scope of process 34.

Process 34 associates (405) the reduced-resolution 3D polygon mesh with the reduced-resolution bones infrastructure. That is, process 34 conforms the 3D polygon mesh to the bones infrastructure. For example, process 34 checks all associations between polygon vertices and bones and assigns or removes such associations, where necessary.

Thereafter, process 34 stores 3D data for the modified 3D model in memory. Using this data, 3D animation that includes the model may be generated.

Figure 6:
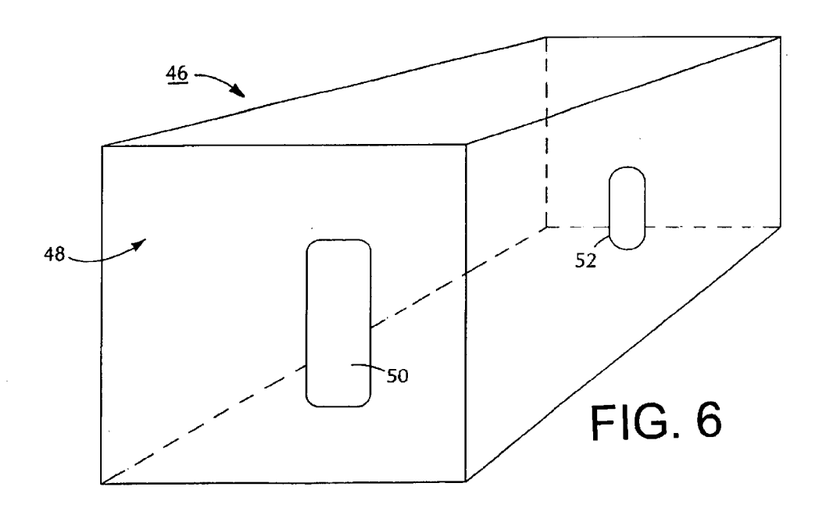
FIG. 6 is a view of a 3D virtual environment.

Process 34 has particular applicability to 3D models that are in the "background" of a 3D environment or that are far from a virtual camera. For example, FIG. 6 shows a 3D environment 46, with plane 48 corresponding to the location of a virtual camera (not shown). Thus, object 50 is closer to the virtual camera than is object 52. Reducing the resolution of object 52 using process 34 will have less of an effect on the resulting 3D animation/display than reducing the resolution of object 50, since object 52 is farther away from the virtual camera than object 50. Thus, process 34 may be performed only on objects that are greater than a predetermined distance from the virtual camera. However, process 34 may be used to reduce the resolution of any and/or all objects in a given 3D environment.

Reducing the resolution of 3D objects by removing bones reduces the amount of data required to render those objects. Since less data is required, 3D animation can be rendered more quickly and with less powerful microprocessors. Moreover, reductions in the amount of data for a model facilitates transmission over limited-bandwidth transmission media.

Process 34 may be performed only once on a set of data for a particular 3D model. Process 34 may also be performed for each keyframe of an animation sequence. A keyframe, in this context, is a frame of animation where significant movement of 3D model 10 has occurred. Keyframes thus provide a snapshot of 3D model 10 at a moment in time. Interim animation is obtained by interpolating between the keyframes.

In the "manual" case described above, process 34 downloads additional keyframes for later segments of animation. The additional keyframes are used to interpret additional steps of animation. For the "automatic" case described above, process 34 uses one set of keyframes. In this case, higher-resolution bones are automatically associated with lower-resolution bones when bones are removed or not yet downloaded.

Figure 7:
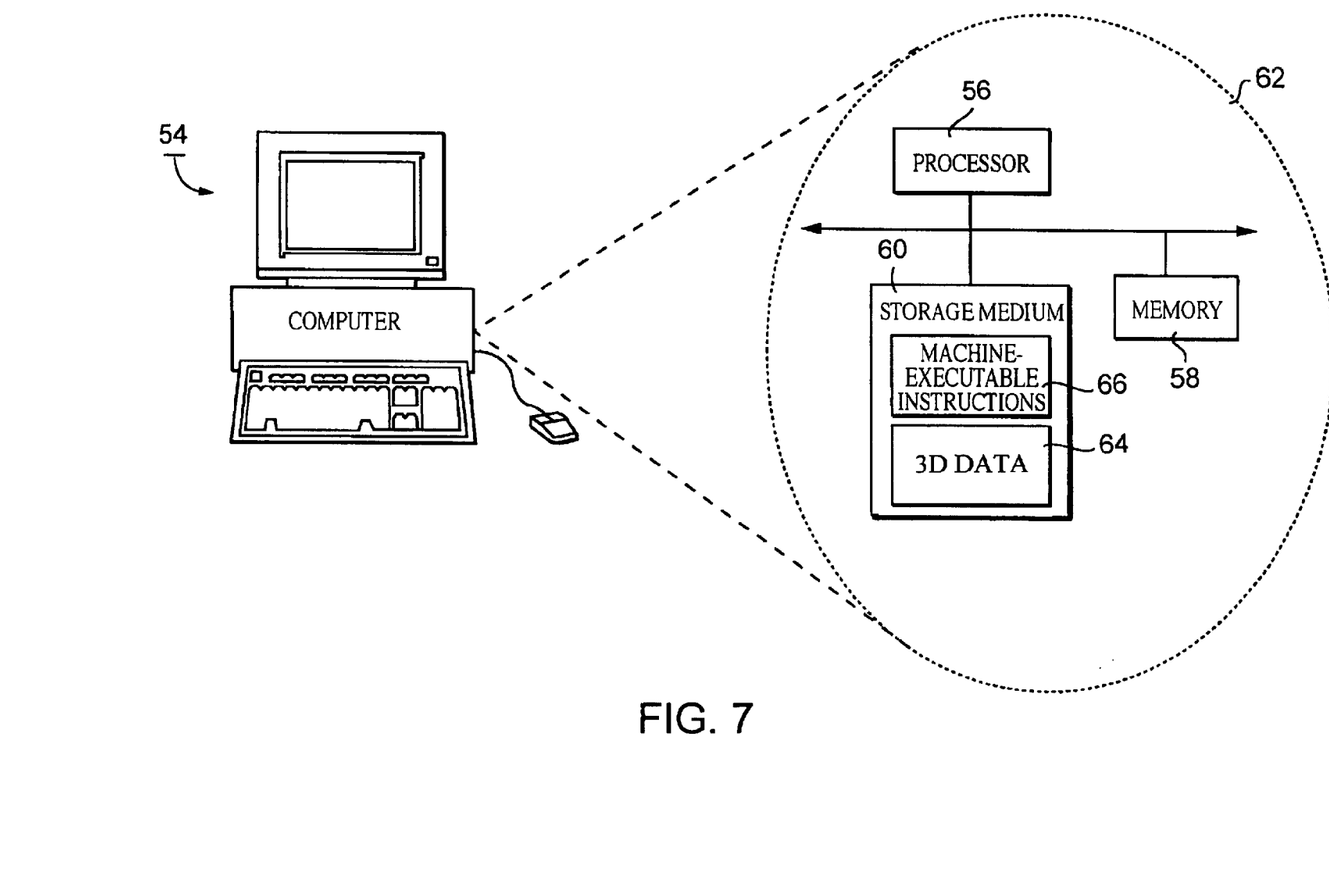
FIG. 7 is a block diagram of a computer system on which the process of FIG. 4 may be executed.

FIG. 7 shows a computer 54 for reducing the resolution of 3D models using process 34. Computer 54 includes a processor 56, a memory 58, and a storage medium 60 (e.g., a hard disk) (see view 62). Storage medium 60 stores 3D data 64, which defines a 3D model, and machine-executable instructions 66, which are executed by processor 56 out of memory 58 to perform process 34 on 3D data 64.

Process 34, however, is not limited to use with the hardware and software of FIG. 7; it may find applicability in any computing or processing environment.

Process 34 may be implemented in hardware, software, or a combination of the two. Process 34 may be implemented in computer programs executing on programmable machines that each includes a processor, a storage medium readable by the processor (including volatile and non-volatile memory and/or storage elements), at least one input device, and one or more output devices. Program code may be applied to data entered using an input device, such as a mouse or a keyboard, to perform process 34 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 34. Process 34 may also be implemented as an article of manufacture, such as a machine-readable storage medium, configured with a computer program, where, upon execution, instructions in the computer program cause the machine to operate in accordance with process 34.

Other embodiments not described herein are also within the scope of the following claims.

What is claimed is:

1. A method of modifying a three-dimensional model comprised of three-dimensional data defining bones and a polygon mesh, the method comprising:

reducing a resolution of the polygon mesh;

reducing a number of bones in the three-dimensional model following reducing the resolution of the polygon mesh; and associating vertices of the polygon mesh having a reduced resolution with bones after the number of bones in the three-dimensional model has been reduced.

2. The method of claim 1, wherein:

the bones are arranged hierarchically such that a lower-resolution bone branches to a higher-resolution bone; and reducing the number of bones comprises removing the higher-resolution bone from the three-dimensional model.

3. The method of claim 1, wherein:

the bones are arranged hierarchically such that a lower-resolution bone branches down to two or more succeeding bones, each of the succeeding bones having a higher resolution than a predecessor bone; and reducing the number of bones comprises:

connecting one of the succeeding bones to the lower-resolution bone; and removing remaining high-resolution bones.

4. The method of claim 3, wherein removing the remaining high-resolution bones comprises removing one or more bones that are between the one of the succeeding bones and the lower-resolution bone.

5. The method of claim 1, wherein reducing the resolution of the polygon mesh comprises combining polygons in the polygon mesh to decrease a number of polygons in the polygon mesh.

6. The method of claim 1, wherein:

the three-dimensional model is located a distance from a virtual camera in a three-dimensional space that the three-dimensional model inhabits; and reductions in the resolution of the polygon mesh and the number of bones are performed if the three-dimensional model is greater than a predetermined distance from the virtual camera.

7. The method of claim 1, further comprising:

receiving an instruction to reduce the number of bones in the three-dimensional model;

wherein, the number of bones is reduced in accordance with the instruction.

8. A method of modifying a three-dimensional model comprised of three-dimensional data defining a polygon mesh, the method comprising:

constructing a bones infrastructure for the polygon mesh;

removing edges of polygons in the polygon mesh to reduce a resolution of the polygon mesh;

receiving an instruction to reduce a number of bones in the bones infrastructure;

reducing the number of bones in the bones infrastructure in response to the instruction following reducing the resolution of the polygon mesh; and associating vertices of the polygon mesh having a reduced resolution with the bones infrastructure having a reduced number of bones.

9. The method of claim 8, wherein the bones are arranged hierarchically such that a lower-resolution bone branches to a higher-resolution bone; and reducing the number of bones comprises removing the higher-resolution bone from the three-dimensional model.

10. The method of claim 8, wherein:

the bones are arranged hierarchically such that a lower-resolution bone branches down to two or more succeeding bones, each of the succeeding bones having a higher resolution than a predecessor bone; and reducing the number of bones comprises:

connecting one of the succeeding bones to the lower-resolution bone; and removing remaining high-resolution bones.

11. An article comprising a machine-readable medium which stores executable instructions to modify a three-dimensional model comprised of three-dimensional data defining bones and a polygon mesh, the instructions causing a machine to:

reduce a resolution of the polygon mesh;

reduce a number of bones in the three-dimensional model following reducing the resolution of the polygon mesh; and associate vertices of the polygon mesh having a reduced resolution with bones after the number of bones in the three-dimensional model has been reduced.

12. The article of claim 11, wherein:

the bones are arranged hierarchically such that a lower-resolution bone branches to a higher-resolution bone; and reducing the number of bones comprises removing the higher-resolution bone from the three-dimensional model.

13. The article of claim 11, wherein:

the bones are arranged hierarchically such that a lower-resolution bone branches down to two or more succeeding bones, each of the succeeding bones having a higher resolution than a predecessor bone; and reducing the number of bones comprises:

connecting one of the succeeding bones to the lower-resolution bone; and removing remaining high-resolution bones.

14. The article of claim 13, wherein removing the remaining high-resolution bones comprises removing one or more bones that are between the one of the succeeding bones and the lower-resolution bone.

15. The article of claim 11, wherein reducing the resolution of the polygon mesh comprises combining polygons in the polygon mesh to decrease a number of polygons in the polygon mesh.

16. The article of claim 11, wherein:

the three-dimensional model is located a distance from a virtual camera in a three-dimensional space that the three-dimensional model inhabits; and reductions in the resolution of the polygon mesh and the number of bones are performed if the three-dimensional model is greater than a predetermined distance from the virtual camera.

17. The article of claim 11, further comprising instructions that cause the machine to:

receive an instruction to reduce the number of bones in the three-dimensional model;

wherein the number of bones is reduced in accordance with the instruction.

18. An article comprising a machine-readable medium that stores executable instructions to modify a three-dimensional model comprised of three-dimensional data defining a polygon mesh, the instructions causing a machine to:
   construct a bones infrastructure for the polygon mesh;
   remove edges of polygons in the polygon mesh to reduce a resolution of the polygon mesh;
   receive an instruction to reduce a number of bones in the bones infrastructure;
   reduce the number of bones in the bones infrastructure in response to the instruction following reducing the resolution of the polygon mesh; and
   associate vertices of the polygon mesh having a reduced resolution with the bones infrastructure having a reduced number of bones.

19. The article of claim 18, wherein the bones are arranged hierarchically such that a lower-resolution bone branches to a higher-resolution bone; and
   reducing the number of bones comprises removing the higher-resolution bone from the three-dimensional model.

20. The article of claim 18, wherein:
   the bones are arranged hierarchically such that a lower-resolution bone branches down to two or more succeeding bones, each of the succeeding bones having a higher resolution than a predecessor bone; predecessor; and
   reducing the number of bones comprises:
      connecting one of the succeeding bones to the lower-resolution bone; and
      removing remaining high-resolution bones.

21. An apparatus to modify a three-dimensional model comprised of three-dimensional data defining bones and a polygon mesh, the apparatus comprising:
   a memory that stores executable instructions; and
   a processor that executes the instructions to:
      reduce a resolution of the polygon mesh;
      reduce a number of bones in the three-dimensional model following reducing the resolution of the polygon mesh; and
      associate vertices of the polygon mesh having a reduced resolution with bones after the number of bones in the three-dimensional model has been reduced.

22. The apparatus of claim 21, wherein:
   the bones are arranged hierarchically such that a lower-resolution bone branches to a higher-resolution bone; and
   reducing the number of bones comprises removing the higher-resolution bone from the three-dimensional model.

23. The apparatus of claim 21, wherein:
   the bones are arranged hierarchically such that a lower-resolution bone branches down to two or more succeeding bones, each of the succeeding bones having a higher resolution than a predecessor bone; predecessor; and
   reducing the number of bones comprises:
      connecting one of the succeeding bones to the lower-resolution bone; and
      removing remaining high-resolution bones.

24. The apparatus of claim 23, wherein removing the remaining high-resolution bones comprises removing one or more bones that are between the one of the succeeding bones and the lower-resolution bone.

25. The apparatus of claim 21, wherein reducing the resolution of the polygon mesh comprises combining polygons in the polygon mesh to decrease a number of polygons in the polygon mesh.

26. The apparatus of claim 21, wherein:
   the three-dimensional model is located a distance from a virtual camera in a three-dimensional space that the three-dimensional model inhabits; and
   reductions in the resolution of the polygon mesh and the number of bones are performed if the three-dimensional model is greater than a predetermined distance from the virtual camera.

27. The apparatus of claim 21, wherein the processor executes instructions to receive an instruction to reduce the number of bones in the three-dimensional model; and
   wherein, the number of bones is reduced in accordance with the instruction.

28. An apparatus to modify a three-dimensional model comprised of three-dimensional data defining a polygon mesh, the apparatus comprising:
   a memory that stores executable instructions; and
   a processor that executes the instructions to:
      construct a bones infrastructure for the polygon mesh;
      remove edges of polygons in the polygon mesh to reduce a resolution of the polygon mesh;
      receive an instruction to reduce a number of bones in the bones infrastructure;
      reduce the number of bones in the bones infrastructure in response to the instruction following reducing the resolution of the polygon mesh; and
      associate vertices of the polygon mesh having a reduced resolution with the bones infrastructure having a reduced number of bones.

29. The apparatus of claim 28, wherein the bones are arranged hierarchically such that a lower-resolution bone branches to a higher-resolution bone; and
   reducing the number of bones comprises removing the higher-resolution bone from the three-dimensional model.

30. The apparatus of claim 28, wherein:
   the bones are arranged hierarchically such that a lower-resolution bone branches down to two or more succeeding bones, each of the succeeding bones having a higher resolution than a predecessor bone; predecessor; and
   reducing the number of bones comprises:
      connecting one of the succeeding bones to the lower-resolution bone; and
      removing remaining high-resolution bones.

* * * * *